United States Patent [19]

Piesik

[11] Patent Number: 4,733,751
[45] Date of Patent: Mar. 29, 1988

[54] ROCKET EXHAUST DISRUPTER

[75] Inventor: Edward T. Piesik, Pomona, Calif.

[73] Assignee: General Dynamics, Pomona Division, Pomona, Calif.

[21] Appl. No.: 814,138

[22] Filed: Dec. 27, 1985

[51] Int. Cl.$^4$ ............................................. B64F 1/26
[52] U.S. Cl. .................................... 181/217; 181/218
[58] Field of Search ............... 181/213, 215, 217, 218, 181/222, 239

[56] References Cited

U.S. PATENT DOCUMENTS

| | | |
|---|---|---|
| 318,735 | 6/1865 | Smith . |
| 938,101 | 10/1909 | Winters . |
| 1,685,701 | 9/1928 | Blanchard . |
| 2,214,770 | 9/1940 | McCurdy ............................ 181/239 |
| 2,512,823 | 6/1950 | Blundell . |
| 2,957,537 | 10/1960 | Morgan . |
| 3,036,653 | 5/1962 | Calabresi ............................ 181/253 |
| 3,159,238 | 12/1964 | Shearer . |
| 3,455,413 | 7/1969 | Henley ................................ 181/213 |
| 4,244,440 | 1/1981 | Matta et al. ......................... 181/213 |
| 4,516,660 | 5/1985 | Greenlaw ......................... 181/215 X |

FOREIGN PATENT DOCUMENTS

| | | | |
|---|---|---|---|
| 393884 | 8/1921 | Fed. Rep. of Germany ...... 181/267 |
| 992706 | 10/1951 | France . |
| 2150218 | 6/1985 | United Kingdom ................ 181/213 |

Primary Examiner—Benjamin R. Fuller
Attorney, Agent, or Firm—Neil F. Martin; Edward B. Johnson

[57] ABSTRACT

An apparatus for reducing the pressure and thermal impingement effects of a supersonic exhaust gas plume emanating from a rocket motor nozzle. A disrupter body positioned within the exhaust plume along the central longitudinal axis thereof disrupts and disperses the plume concentration. The body has a central passage through which a portion of the exhaust may pass. The body and passage are sized and shaped to provide a flow area normal to the exhaust flow less than the cross-sectional area of the exhaust plume at the position of the body. The reduced flow area causes the exhaust flow to undergo a normal shock wave upstream of the body before passing through and around the body at a subsonic velocity. The presence and configuration of the body disrupts and disperses the plume concentration, and the reduced flow velocity significantly reduces the downstream pressure and thermal effects of the exhaust gas plume.

8 Claims, 6 Drawing Figures

ROCKET EXHAUST DISRUPTER

BACKGROUND OF THE INVENTION

The thermal and pressure impingement effects of exhaust gases emanating from a rocket motor nozzle extend longitudinally well beyond the exit plane of the nozzle because of the concentrated supersonic flow pattern characteristic of the exhaust gas plume. Relatively small tactical missile rocket motors have nozzle exit velocities on the order of Mach 3.5 with recovery pressures of 300 pounds per square inch and recovery temperatures in excess of 5,000 degrees Fahrenheit. These high velocities, pressures and temperatures encountered in tactical or test firings of the rocket motor remain concentrated in the plume extending its length and result in destructive final pressure and thermal impingement effects in a relatively small area to the rear of the motor. In open environment static test firings, this necessitates strong and thermally protected structures positioned a considerable distance to the rear of the rocket nozzle, or a relatively vast open area behind the rocket. Test firings of the rocket motor into a duct or plenum require that similar features be incorporated in the plenum design to avoid destruction of the enclosure by the exhaust gas impingement. In tactical firings, the launching pad and components must also be protected. Provision of structures that can withstand the adverse temperature and pressure of the rocket motor exhaust increase the complexity and cost of the installations involved if firing safety is to be preserved.

It is desirable, therefore, to provide an apparatus to mitigate the thermal and pressure impingement effects. Applicant3 s invention transforms the initial supersonic exhaust gas velocity to one of subsonic (or much reduced supersonic) magnitude and provides for the dispersion of the exhaust plume to reduce these effects as well as shortening the effective length of a free exhaust gas plume.

SUMMARY OF THE INVENTION

According to the precepts of the invention, a disrupter body is positioned within the supersonic plume of a rocket motor exhaust flowing from the rocket motor nozzle. The body has a longitudinal passage, the central axis of which is subsequentially coaxial with the central longitudinal axis of the exhaust gas plume. The body and passage are sized and shaped to provide a flow area for the exhaust gases less than the cross-sectional area of the exhaust plume at the position of the body. As a consequence of the reduced flow area caused by the body, the motor exhaust gases may pass around and through the body passage only after undergoing a normal shock wave upstream of the body. The normal shock wave results in subsonic exhaust gas flow velocity downstream of the shock wave, greatly reducing exhaust temperature and pressure impingement effects farther downstream. Also, since exhaust gases pass around the body and through the body passage, the exhaust plume is dispersed.

In the illustrated embodiment the disrupter body is cylindrical and the central passage through the body has a frusto-conic shape with the apex in the direction of the exhaust flow. These features provide the requisite exhaust flow restriction to generate a normal shock wave while preserving the advantages of a faired aerodynamic shape.

Downstream of the disrupter body the exhaust gases may again achieve supersonic flow if the ambient pressure is sufficiently low, but at a much lower value. The lower the velocity of the exhaust at the region of final impingement of the exhaust, the lower the impingement pressure and heat effects. A further precept of the invention is the use of a plurality of disrupter bodies positioned in tandem, or cascade, relationship with each disrupter body intercepting the previous flow and causing an additional normal shock wave to further reduce the downstream exhaust gas flow velocity.

The primary advantage of the invention is to provide a new and improved disrupter for a rocket motor exhaust gas plume. The disrupter disperses the characteristic concentrated supersonic exhaust gas plume of a rocket motor reducing the exhaust gas flow velocity, and thereby the final thermal and pressure impingement effects created by such flow. The design of the disrupter is such as to be readily adaptable to use in plenums or ducts, in an open environment, at launch pads, or attached to the missile itself. The disupter body has an aerodynamic form and is relatively inexpensive to produce. Further advantages of the use of the disrupter will become apparent upon the reading of the following detailed description in conjunction with the drawings in which like numerals refer to like parts throughout.

DETAILED DESCRIPTION OF THE DRAWINGS

The rocket motor exhaust disrupter apparatus of applicant's invention will be described in the context of a test firing of a rocket motor wherein the exhaust gas emanating from motor nozzle is directed into a plenum chamber or duct. It should be understood, however, that the results achieved by the apparatus would be essentially the same in an open environment in reducing the length of a free-exhaust plume and mitigating the temperature and pressure impingement effects of the plume at the launch point in tactical rocket motor firings.

Figure 6:
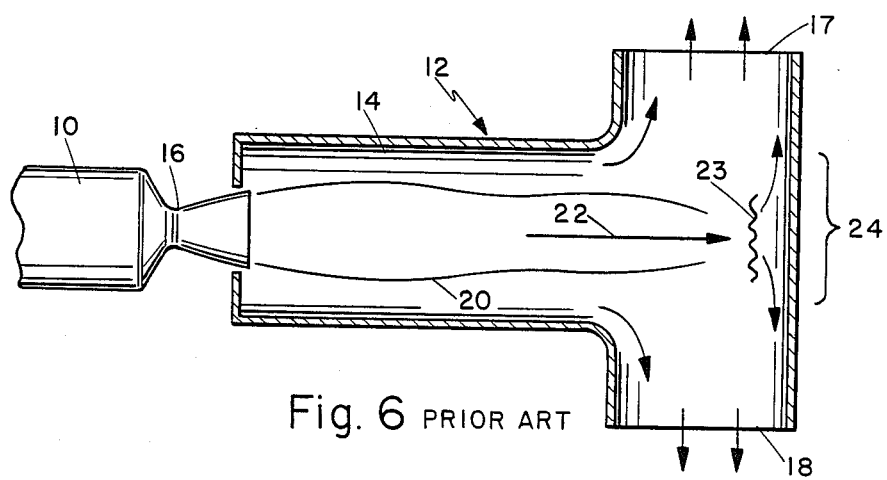
FIG. 6 illustrates a characteristic rocket exhaust plume in a plenum chamber without the disrupter.

FIG. 6 illustrates the firing of a representative rocket motor 10 into a cylindrical T-shaped plenum chamber 12 without the use of applicant3 s invention. The plenum 12 has an entrance portion 14 and two exits 16 and 18. The support fixtures of the motor 10 and the plenum 12 are not shown. The rocket motor exhaust gases emanating from the motor combustion chamber exit from the motor nozzle 16 and form a concentrated plume 20. The plume 20 is illustrative of the characteristic of the supersonic flow pattern of such exhaust gases and extends well beyond the exit plane of the nozzle 16. The plume is symmetrical about the central longitudinal axis 22 of the motor 10. Within the plume 20 initial exhaust gas velocity of Mach 3 to 4 is typical, accompanied by recovery pressures of 200 pound per square inch, and recovery temperatures in excess of 5.000° Fahrenheit. The velocity, pressure, and thermal characteristics of the high energy gases remain concentrated in the plume 20 resulting in a normal shock wave 23 upon impingement upon the interior of the plenum 12 in a limited region of final impingement 24 because of the shape of the plume 20. As a result, the plenum must be of substantial strength and size, and be provided with active or passive cooling means to protect the plenum structure at final impingement if the rocket motor 10 is to be safely test fired.

Figure 1:
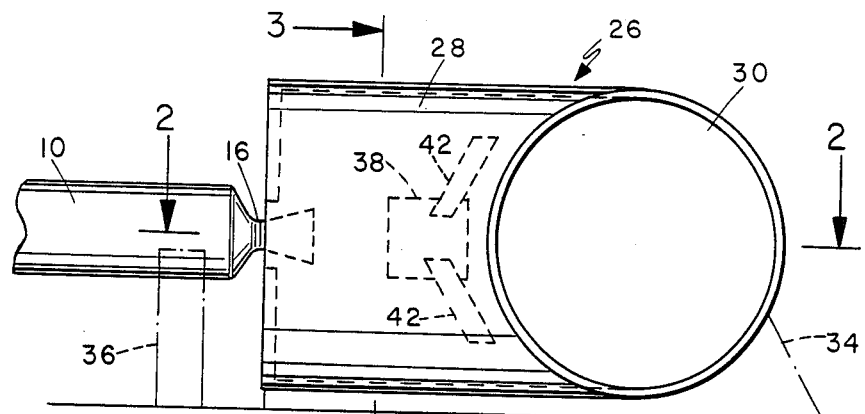
FIG. 1 is a side elevation view of an exhaust disrupter and plenum chamber structure with a burning rocket motor in place.
Figure 2:
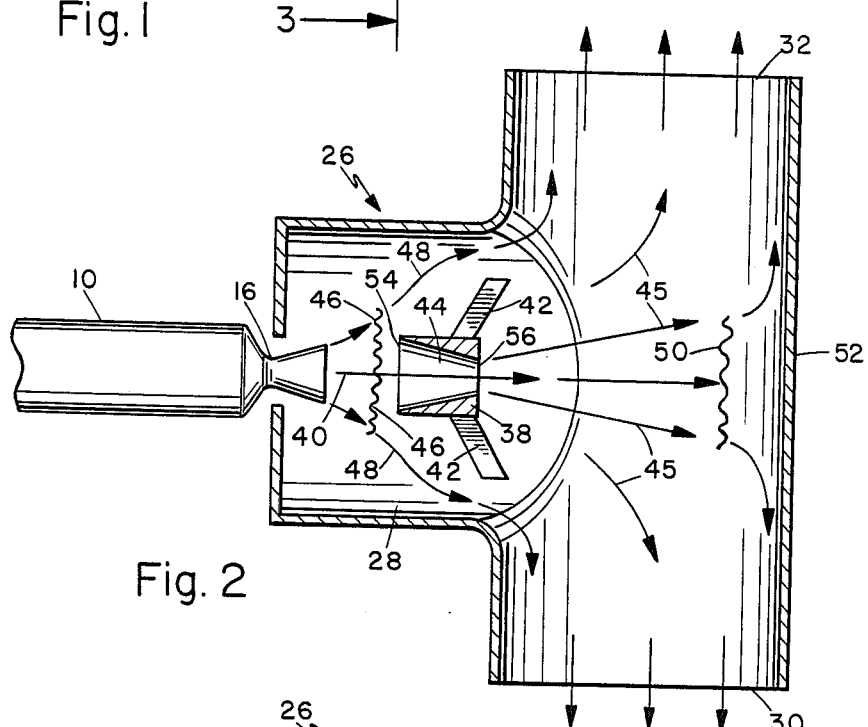
FIG. 2 is a sectional view taken on line 2—2 of FIG. 1.
Figure 3:
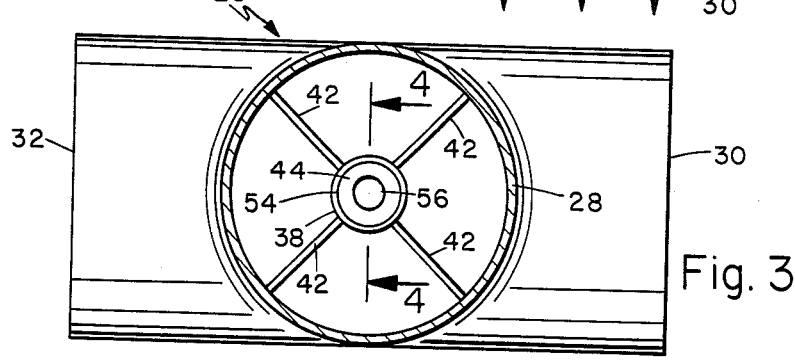
FIG. 3 is a sectional view taken on line 3—3 of FIG. 1.

An illustrated embodiment of the applicant3 s invention to reduce the final impingement effects of the exhaust gas plume 20 is illustrated in FIGS. 1 and 2. As in FIG. 6, a burning rocket motor 10 is depicted as exhausting into the interior of a plenum chamber 26 of circular cross section. The plenum 26 has an entrance section 28 and two exhaust gas exits 30 and 32. The plenum 26 is mounted in a fixed ground support structure 34 and the rocket motor 10 is held in a ground mounted test fixture 36 to establish and maintain the central longitudinal axis of the motor 10 coaxial with the central longitudinal axis 40 of the plenum entrance section 28. A disrupter body 38 is mounted on the central longitudinal axis of the plenum entrance section 28 and spaced from the motor exhaust nozzle 16 so as to be enveloped by the exhaust plume exiting the nozzle 16. The disrupter body 38 is supported in the plenum entrance section 28 by four struts 42 (FIG. 3) which attach the body to the wall of the plenum.

As illustrated in FIG. 2, the disrupter body 38 is designed with a central passage 44 through which a portion of the motor exhaust gases may pass. The disrupter body 38 is designed to present a cross-section area opposing the flow of exhaust gases less than the area of the exhaust gas plume at the position of the disrupter. Due to the reduction in the exhaust flow area caused by the disrupter, exhaust gases may pass through the passage 44 and around the body 38 only after undergoing a normal shock wave 46 upstream of the disrupter body transforming the exhaust gas flow velocity from supersonic to subsonic magnitude. The exhaust which does not pass through the passage 44 deflects around it as indicated by the arrows 48. Because of the velocity reduction and alternative exhaust gas flow paths at the disrupter 38, the impingement loads on the disrupter 38 and downstream of the disrupter are greatly reduced. If the ambient pressure downstream of the disrupter body 38 is sufficiently low, the subsonic exhaust leaving the passage 44 may again attain supersonic velocity, but of a significantly lesser magnitude. This result is illustrated in FIG. 2 wherein the exhaust is depicted as undergoing a second normal shock wave at 50 prior to final impingement against the wall 52 of the plenum chamber.

So long as a normal shock wave 46 is created by the presence of the disrupter body 38, varying disrupter body and passage configurations may be used to achieve the dispersion of the concentrated exhaust gas plume in the manner described. In the preferred configuration illustrated, the disrupter body 38 is formed as a cylinder, and the passage 44 has a frusto-conic shape with the base 54 of the cone confronting the exhaust flow and the smaller area 56 in the direction of the exhaust flow. The apex angle 57 of the conically shaped passage 44 is preferably designed to be between 20 to 30 degrees.

This configuration of the passage 44 provides the requisite reduction in the exhaust flow area of the body 38 while at the same time achieving the benefits of a faired aerodynamic shape. It should be understood that different apex angles could be employed. Analysis indicates that apex angles between 5 and 30 degrees would be suitable. Either active or passive thermal protection of the configuration is presumed in the concept.

Figure 4:
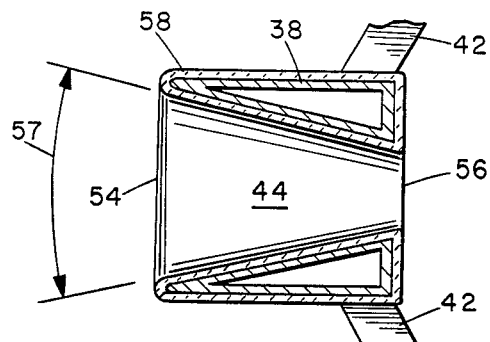
FIG. 4 is an enlarged sectional view taken on line 4—4 of FIG. 3, showing the construction of the disrupter apparatus.

Further details of the construction of the disrupter body 38 are illustrated in FIG. 4. Despite the reduction of exhaust velocity occasioned by the shock wave 46, and the consequent lessening of the impingement effects upon the disrupter body 38, the disrupter will still experience significant thermal impingement effects. In the embodiment illustrated the surfaces of the disrupter body 38 are protected from exhaust impingement heating by a layer 58 of thermal ablative material attached by a suitable adhesive. Other heat mitigating means could be employed such as an internal water cooling system for the disrupter body 38.

Figure 5:
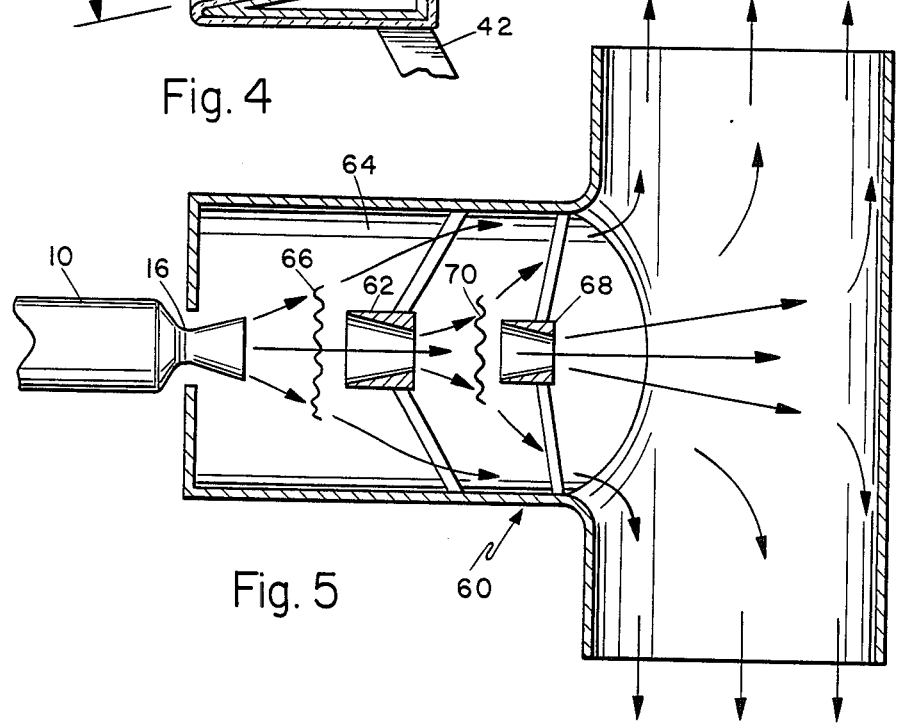
FIG. 5 is a view similar to FIG. 2, showing an alternative tandem disrupter arrangement.

FIG. 5 illustrates a test stand installation wherein further dispersion of the rocket motor exhaust plume is desired beyond the capability of a single disrupter body. As before, the exhaust from a burning rocket motor 10 is directed into a plenum chamber 60 having a configuration similar to those described in connection with FIGS. 1 and 2. A first exhaust disrupter body 62 is positioned as before within the plenum entrance section 64 resulting in the exhaust undergoing a first normal shock wave at 66 upstream of the body 62. The presence of the disrupter body 62 results in exhaust velocity reduction as previously described. A second exhaust disrupter body 68 is positioned in tandem with and downstream of the first disrupter body 62 and results in the exhaust gas undergoing a second normal shock wave 70 upstream of the body 68, and a second reduction in exhaust flow velocity to essentially subsonic flow with attendant low impingement heat transfer and pressure effects. The presence of body 68 further disperses the exhaust. Additional disrupter bodies could be employed, but the reduction in downstream recovery pressure decreases with each shock wave, and the preferred illustrated embodiment therefore relies upon the use of two disrupter units.

Having described my invention, what is claimed is:

1. An apparatus for disrupting a supersonic exhaust gas plume emanating from a rocket motor nozzle, comprising:

a disrupter body having a central through bore with a longitudinal axis, the central through bore having an inlet opening at one axial end and an outlet at the opposite axial end;

a support structure for supporting the disrupter body spaced from a rocket motor nozzle with the longitudinal axis of the central through bore substantially in alignment with a central longitudinal axis of the rocket motor nozzle;

the inlet opening of the central bore being positioned closest to the rocket motor nozzle, the inlet opening having an area less than the cross-sectional area of an exhaust gas plume ejected from the rocket motor nozzle at the inlet opening;

the disrupter body being shaped for directing exhaust flow both through the central bore and around the disrupter body and for causing an exhaust gas shock wave normal to the central longitudinal axis of the rocket motor nozzle and spaced between the rocket motor nozzle and said disrupter body.

2. An apparatus as recited in claim 1 wherein:
said disrupter body has an outer surface of generally cylindrical shape; and
said central through bore has a frustoconical shape with an included angular section having an apex oriented in the direction of the exhaust gas flow.

3. An apparatus as recited in claim 2 wherein:
the angle at said apex of said cone is between 5 and 30 degrees.

4. An apparatus as recited in claim 3 further comprising:
a layer of thermal ablative material covering the inner and outer surfaces of said disrupter body for providing thermal protection to said surfaces.

5. A method for disrupting a supersonic exhaust gas plume emanating from a rocket motor nozzle, comprising the steps of:
mounting a disrupter body on a support structure in the path of the exhaust gas flow from a rocket motor nozzle spacing the disrupter body apart from the rocket motor nozzle, providing a central through bore in the disrupter body of tapering cross section in alignment with a central axis of the rocket motor nozzle, the through bore having an inlet opening at one end and an outlet opening at the opposite end, positioning the inlet opening closest to the rocket motor nozzle with the inlet opening and being of an area larger than the outlet opening and less than an area occupied by the exhaust flow at the inlet opening;
directing the exhaust flow through the inlet opening and around the disrupter body and causing a shock wave normal to the path of the exhaust gas plume.

6. The method as claimed in claim 5, including the further steps of:
positioning at least one additional disrupter body downstream of and aligned with the first mentioned disrupter body, the additional disrupter body being of smaller dimensions than the first mentioned disrupter body and having a tapered through bore with an inlet opening of smaller diameter than the exhaust flow diameter at the inlet end of the additional disrupter body;
further disrupting the gas flow by directing it through and around the additional disrupter body after it passes the first mentioned disrupter body by further restricting the cross-sectional area of the exhaust gas plume at the additional disrupter body and by causing an additional shock wave to form normal to the central longitudinal axis of the exhaust gas plume.

7. An apparatus for disrupting a supersonic exhaust gas plume emanating from a rocket motor nozzle, comprising:
a disrupter body having a central through bore of tapering diameter with an inlet opening at one end and an outlet opening of smaller diameter than the inlet opening at the opposite end, the through bore being of generally frusto-conical shape and having an included angular section of no greater than 30 degrees, and the disrupter body having an outer surface of generally cylindrical shape;
means for supporting the disrupter body spaced from the rocket motor nozzle with the central through bore aligned with a central longitudinal axis of the rocket motor nozzle and the inlet opening closest to the rocket motor nozzle for restricting the exhaust gas flow;
the inlet opening having a cross-sectional area less than the cross-sectional area of the exhaust gas plume at the inlet opening;
the disrupter body being shaped for restricting the exhaust gas plume area at the inlet opening and causing portions of the exhaust gas plume to flow through and around the disrupter body, and for causing a shock wave to form normal to the central longitudinal axis of the rocket motor nozzle.

8. Apparatus as claimed in claim 7 including at least one additional disrupter body having a tapering central through bore of smaller dimensions than the through bore in the first mentioned disrupter body, and means for supporting the additional disrupter body at a position downstream and spaced from the outlet end of the first mentioned disrupter body, the additional disrupter body through bore having an inlet opening of smaller diameter than the diameter of the exhaust gas plume at the inlet end of the additional disrupter body, the additional disrupter body comprising means for further restricting the area of the exhaust gas plume and directing it through and around the additional disrupter body, and for thereby causing an additional normal shock wave to form.

* * * * *